(12) United States Patent
Packer et al.

(10) Patent No.: US 10,868,358 B2
(45) Date of Patent: Dec. 15, 2020

(54) ANTENNA FOR WEARABLE RADIO SYSTEM AND ASSOCIATED METHOD OF MAKING

(71) Applicant: Harris Solutions NY, Inc., Rochester, NY (US)

(72) Inventors: Malcolm J. Packer, Fairport, NY (US); Joseph D. Majkowski, Pittsford, NY (US); Brian D. DeVito, Penfield, NY (US); William A. Christiano, Avon, NY (US); James D. Richards, Spencerport, NY (US)

(73) Assignee: HARRIS SOLUTIONS NY, INC., Albany, NY (US)

( * ) Notice: Subject to any disclaimer, the term of this patent is extended or adjusted under 35 U.S.C. 154(b) by 420 days.

(21) Appl. No.: 15/787,746

(22) Filed: Oct. 19, 2017

(65) Prior Publication Data

US 2019/0123428 A1  Apr. 25, 2019

(51) Int. Cl.
*H01Q 1/27* (2006.01)
*H01Q 9/04* (2006.01)
*H01Q 1/48* (2006.01)
*H01Q 21/30* (2006.01)
*H01Q 5/307* (2015.01)

(Continued)

(52) U.S. Cl.
CPC ............ *H01Q 1/273* (2013.01); *H01Q 1/085* (2013.01); *H01Q 1/48* (2013.01); *H01Q 5/307* (2015.01); *H01Q 5/321* (2015.01); *H01Q 9/0407* (2013.01); *H01Q 9/30* (2013.01);

(Continued)

(58) Field of Classification Search
CPC ........ H01Q 1/273; H01Q 9/0407; H01Q 1/48; H01Q 21/30; H01Q 5/307; H01Q 9/30; H01Q 5/321; H01Q 1/085; H01Q 9/40; H01Q 13/106; H04B 1/385
See application file for complete search history.

(56) References Cited

U.S. PATENT DOCUMENTS 2,576,128 A * 11/1951 Lense .................... H01Q 1/273
343/718
3,523,296 A * 8/1970 Vliegenthardt ........ H01Q 1/273
343/718

(Continued)

FOREIGN PATENT DOCUMENTS

GB        2539327       12/2016
WO        0163699       8/2001

(Continued)

*Primary Examiner* — Daniel Munoz
*Assistant Examiner* — Bamidele A Jegede
(74) *Attorney, Agent, or Firm* — Allen, Dyer, Doppelt + Gilchrist, P.A.

(57) ABSTRACT

An antenna includes an elongate dielectric strip having opposing first and second sides. A first conductive pattern defines a first radiating element for a first frequency range on the first side of the elongate dielectric strip. A second conductive pattern defines a second radiating element for a second frequency range on the first side of the elongate dielectric strip. The second frequency range is different than the first frequency range. A diplexer circuit is on the elongate dielectric strip between said first and second radiating elements and coupled thereto. A third conductive pattern defines a shared ground plane for the first and second radiating elements on the second side of the elongate dielectric strip.

21 Claims, 7 Drawing Sheets

(51) Int. Cl.
*H01Q 9/30* (2006.01)
*H01Q 5/321* (2015.01)
*H01Q 1/08* (2006.01)
*H01Q 9/40* (2006.01)
*H01Q 13/10* (2006.01)
*H04B 1/3827* (2015.01)

(52) U.S. Cl.
CPC ............. *H01Q 9/40* (2013.01); *H01Q 13/106* (2013.01); *H01Q 21/30* (2013.01); *H04B 1/385* (2013.01)

(56) References Cited

U.S. PATENT DOCUMENTS

| | | | | |
|---|---|---|---|---|
| 3,902,118 | A * | 8/1975 | Ikrath | H04B 1/0343 455/100 |
| 4,041,394 | A * | 8/1977 | Pate | H04B 1/0343 455/100 |
| 4,847,629 | A * | 7/1989 | Shimazaki | H01Q 1/10 343/901 |
| 6,179,666 | B1 * | 1/2001 | Osborn | H04B 1/385 439/669 |
| 6,195,065 | B1 * | 2/2001 | Hung | H01Q 3/247 343/745 |
| 6,256,938 | B1 | 7/2001 | Daton-Lovett | |
| 6,590,540 | B1 * | 7/2003 | Adams | H01Q 1/085 343/718 |
| 6,919,850 | B2 | 7/2005 | Kennedy et al. | |
| 6,940,462 | B2 | 9/2005 | Packer | |
| 7,053,851 | B1 | 5/2006 | Bogdans et al. | |
| 7,755,553 | B2 * | 7/2010 | Packer | H01Q 5/35 343/718 |
| 7,969,369 | B2 * | 6/2011 | Wertman | H04B 1/385 343/718 |
| 9,209,514 | B2 | 12/2015 | Sivalingam | |
| 9,287,630 | B2 | 3/2016 | Choudhury et al. | |
| 9,343,800 | B2 * | 5/2016 | Tran | H01Q 1/242 |
| 10,003,369 | B2 * | 6/2018 | Ooi | A45F 3/14 |
| 2003/0155389 | A1 | 8/2003 | Swartzentruber | |
| 2004/0036655 | A1 * | 2/2004 | Sainati | H01Q 1/243 343/702 |
| 2004/0145522 | A1 * | 7/2004 | Wang | H01Q 1/38 343/700 MS |
| 2004/0212540 | A1 * | 10/2004 | Kennedy | H01Q 1/12 343/718 |
| 2005/0062659 | A1 * | 3/2005 | Packer | H01Q 1/273 343/718 |
| 2005/0073465 | A1 * | 4/2005 | Olson | H01Q 1/38 343/795 |
| 2007/0063913 | A1 * | 3/2007 | Wu | H01Q 21/0075 343/824 |
| 2008/0074340 | A1 * | 3/2008 | Song | H01Q 1/38 343/816 |
| 2009/0051609 | A1 * | 2/2009 | Packer | H01Q 9/16 343/718 |
| 2010/0141545 | A1 * | 6/2010 | Pakosz | H01Q 9/285 343/810 |
| 2012/0280869 | A1 * | 11/2012 | Kirkham | H01Q 1/084 343/718 |
| 2013/0017696 | A1 * | 1/2013 | Alvarez Rivera | H01R 13/5213 439/142 |
| 2014/0266622 | A1 * | 9/2014 | Alicot | G06K 19/07771 340/10.1 |
| 2015/0244075 | A1 * | 8/2015 | Platt | H01Q 1/38 343/792 |
| 2016/0345695 | A1 | 12/2016 | Stagge | |

FOREIGN PATENT DOCUMENTS

| WO | 2015/033085 | 3/2015 |
| WO | 2016/116970 | 7/2016 |

* cited by examiner

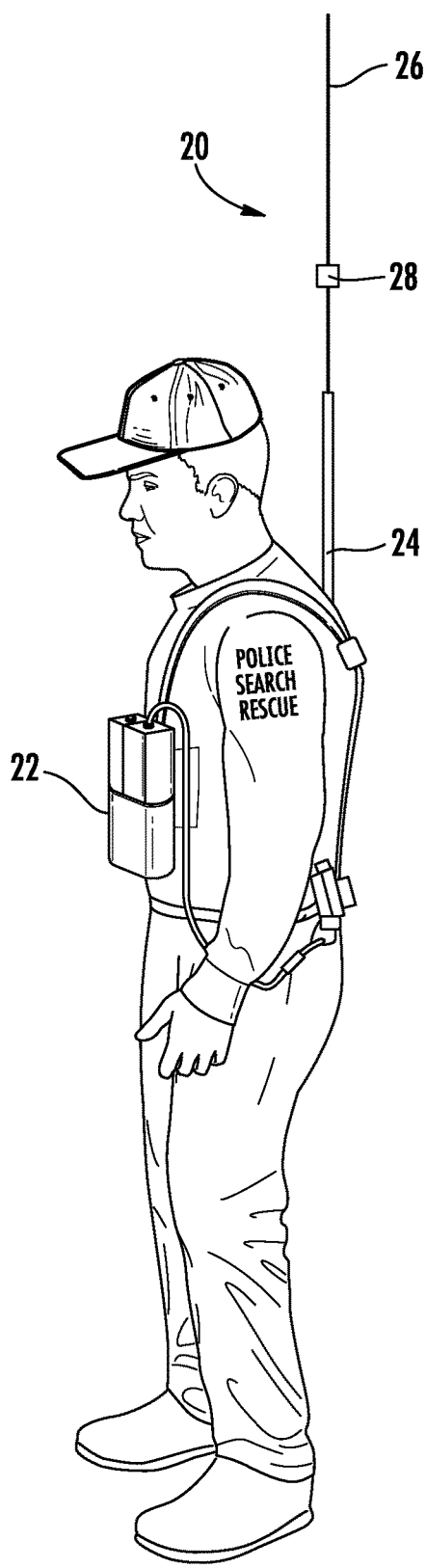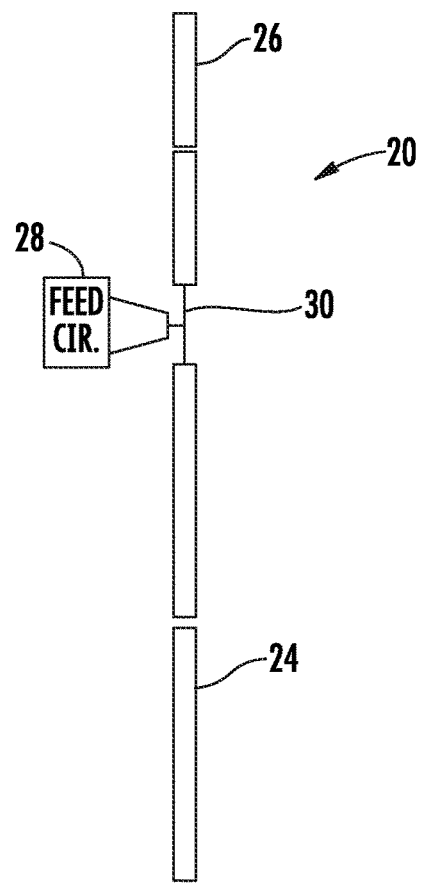
FIG. 1
PRIOR ART
FIG. 2
PRIOR ART

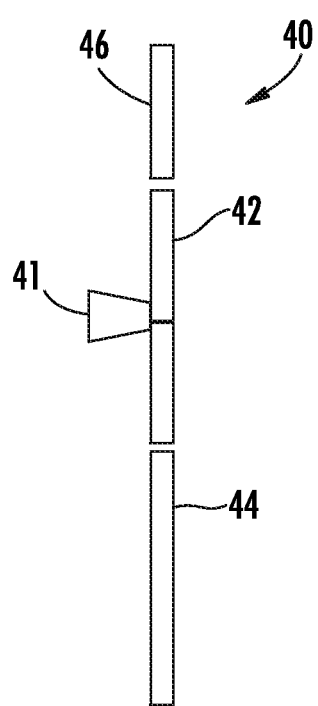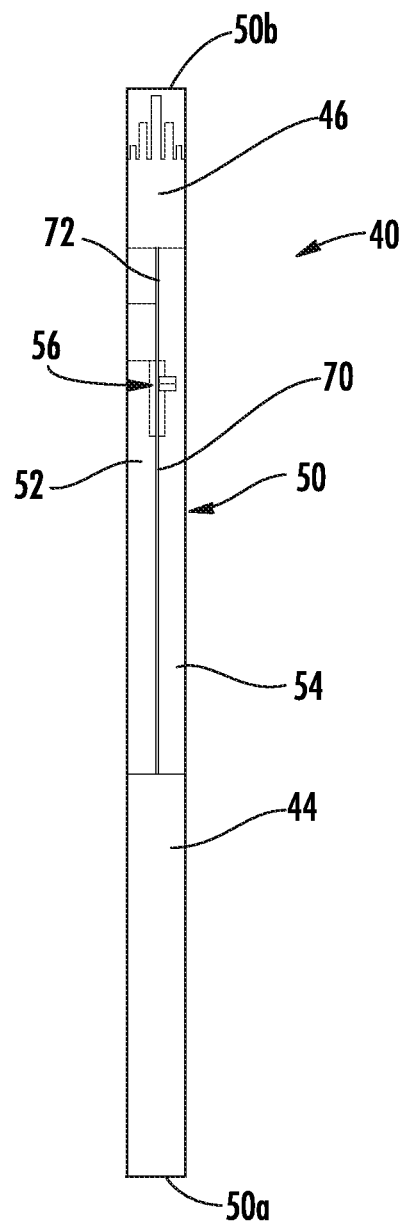
FIG. 3
FIG. 4

ANTENNA FOR WEARABLE RADIO SYSTEM AND ASSOCIATED METHOD OF MAKING

FIELD OF THE INVENTION

The present invention relates to antennas, and more particularly, to a wearable radio system and antenna and a method of making the antenna.

BACKGROUND OF THE INVENTION

High-performance radio transceivers used by military, first responders, emergency personnel and similar users have become increasingly more powerful and include multiple frequency bands, however, antenna designs have not advanced accordingly. Some progress has been made in recent years to reduce the size and number of antennas by increasing their flexibility and providing support for multiple frequency bands. Of particular interest to military, first responders and other emergency personnel are the ergonomic and performance innovations accompanying the area of body-worn antennas. Body worn antennas can be covert and low profile or protrude above and over the head.

Body worn antennas can be convert and low profile, or overt and protrude above the head. In addition, body-worn antennas are worn close to the body and when they do not extend above the head, they are less likely to hinder the agility and movement of the user or impede rapid access to the radio transceiver and other essential devices. If a body-worn antenna is flush mounted on the body, however, it may decrease radio transceiver performance. Sometimes a foam layer is placed on the antenna between the body. This improves performance, but this approach often makes the antenna awkward and inflexible for use. Current body-worn antennas may have other drawbacks, including a cumbersome connection process, a tendency to lose signal strength if too close to the body, and an awkward antenna mounting system.

There are also performance and reliability issues because these body-worn antennas often were not designed for integration with the high-performance radio transceivers now being used by military, first responders, emergency personnel and similar users. For example, some body-worn antennas have limited bandwidth to only a single band, which is inappropriate for a multiband radio transceiver. Also, current body-worn antennas are often large and inflexible and impede movement. Users of such body-worn antennas often create their own "fixes" such as rolling up and down the antenna, often 10 to 20 times a day, or affixing it under a shoulder pad so it does not interfere with other activities. Some users forgo use of conventional body-worn antennas and instead use a single band whip antenna, which is often suitable for a single frequency but not multiple bands of frequencies. They also may be suitable for many lower frequency communications, such as in the UHF-band, but not suitable for higher frequency communications, such as in the L-band.

This produces a need for an antenna that may be used with a wearable radio system and provide flexibility, ease of connection and consistency of performance across at least two frequency bands without significant signal loss. This antenna should maintain a low-profile while reducing signal absorption and shadow effects without impacting the signal strength when the antenna is worn close to the body. Additionally, the antenna should not hinder the user's ability to readily access the radio transceivers, for example, for attaching accessories such as handsets, terminals, and other accessories.

SUMMARY OF THE INVENTION

An antenna includes an elongate dielectric strip having opposing first and second sides. A first conductive pattern defines a first radiating element for a first frequency range on the first side of the elongate dielectric strip. A second conductive pattern defines a second radiating element for a second frequency range on the first side of the elongate dielectric strip. The second frequency range is different than the first frequency range. A diplexer circuit is on the elongate dielectric strip between the first and second radiating elements and coupled thereto. A third conductive pattern defines a shared ground plane for the first and second radiating elements on the second side of the elongate dielectric strip.

The shared ground plane in an example may comprise longitudinally adjacent first and second ground plane portions, and may further comprise a filter coupled between the first and second ground plane portions so that the first and second ground plane portions function as a ground plane for the first radiating element and the second ground plane portion functions as a ground plane for the second radiating element. The first ground plane portion may have at least one beam pattern shaping slot therein. A fourth conductive pattern may define respective first and second transmission lines coupling the diplexer circuit to the respective first and second radiating elements on the first side of the elongate dielectric strip. The shared ground plane may comprise respective first and second slots aligned with the first and second transmission lines, respectively.

The first radiating element may extend to a first end of the elongate dielectric strip and the second radiating element may extend to a second end of the elongate dielectric strip. The elongate dielectric strip may comprise a bistable elongate dielectric strip. In an example, the first frequency range is between 225 to 450 MHz, and the second frequency range is between 1300 to 2600 MHz.

In yet another example, a wearable radio system may comprise a wearable vest and a radio transceiver carried by the wearable vest. An antenna is carried by the wearable vest and coupled to the radio transceiver. The antenna comprises an elongate dielectric strip having opposing first and second sides. A first conductive pattern defines a first radiating element for a first frequency range on the first side of the elongate dielectric strip. A second conductive pattern defines a second radiating element for a second frequency range on the first side of the elongate dielectric strip, the second frequency range being different than the first frequency range. A diplexer circuit is on the elongate dielectric strip between the first and second radiating elements and coupled thereto. A third conductive pattern defines a shared ground plane for the first and second radiating elements on the second side of the dielectric strip.

In yet another example, a method of making an antenna comprises forming a first conductive pattern defining a first radiating element for a first frequency range on a first side of an elongate dielectric strip and forming a second conductive pattern defining a second radiating element for a second frequency range on the first side of the elongate dielectric strip, the second frequency range being different than the first frequency range. The method further comprises forming a diplexer circuit on the elongate dielectric strip between the first and second radiating elements and coupled thereto and forming a third conductive pattern defining a shared ground plane for the first and second radiating elements on a second side of the elongate dielectric strip.

DESCRIPTION OF THE DRAWINGS

Other objects, features and advantages of the present invention will become apparent from the detailed description of the invention which follows, when considered in light of the accompanying drawings in which:

FIG. 1 is a fragmentary environmental view of a user wearing a radio system and prior art dual band whip style antenna.

FIG. 2 is a schematic diagram of the prior art dual band whip antenna shown in FIG. 1.

FIG. 3 is a fragmentary block diagram of the antenna having a shared ground plane for first and second radiating elements in accordance with a non-limiting example.

FIG. 4 is a top plan view of the first side of the dielectric strip used in the antenna of FIG. 3.

DETAILED DESCRIPTION

Figure 5:
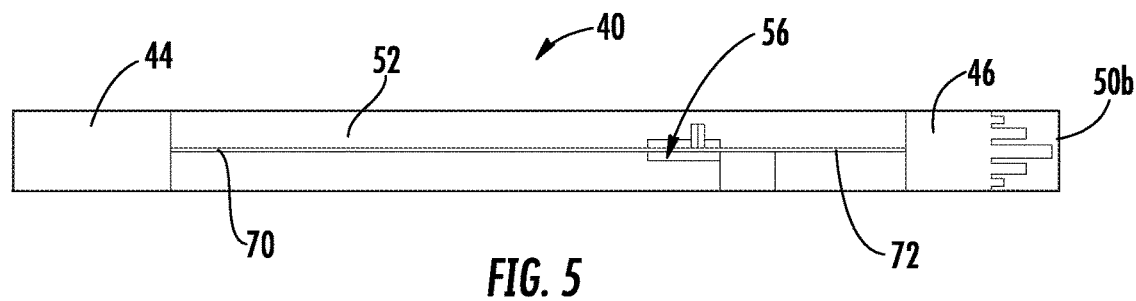
FIG. 5 is an enlarged top plan view of the first side of the dielectric strip in the antenna of FIG. 4.

The present description is made with reference to the accompanying drawings, in which exemplary embodiments are shown. However, many different embodiments may be used, and thus, the description should not be construed as limited to the particular embodiments set forth herein. Rather, these embodiments are provided so that this disclosure will be thorough and complete. Like numbers refer to like elements throughout, and prime notation is used to indicate similar elements in different embodiments.

A prior art dual band whip antenna is indicated generally at 20 in FIGS. 1 and 2 and is carried on the back of a user and coupled to a conventional radio transceiver 22. This type of dual band whip antenna 20 is large and cumbersome and extends above the head, making it burdensome during essential activities, for example, ingress through windows. In an example, this antenna 20 includes first and second radiating elements 24, 26. The first radiating element 24 operates in the UHF band and the second radiating element 26 operates in the L-band. The antenna 20 includes a feed circuit 28 at an isolation gap 30 as illustrated in FIG. 2.

Referring now to FIGS. 3-9, the antenna indicated generally at 40, in accordance with a non-limiting example, overcomes the drawbacks of not only prior art whip antennas such as shown in FIGS. 1 and 2, but also more conventional, body-worn antennas. As best shown in the block diagram example of FIG. 3, the antenna 40 includes a feed 41 into a shared ground plane 42 for first and second radiating elements 44, 46 to provide a dual band antenna useful, for example, in both the UHF band and L-band. The antenna 40 is lightweight, flexible and has a reduced size because the shared ground plane 42 improves performance, and addresses the pattern distortion issue that may occur with shorter dual band antennas. Throughout this description, different terms are used. Conductive pattern, such as on the dielectric strip, may refer also to printed traces and coupling can be a direct connection, or in some examples, even wireless.

Figure 6:
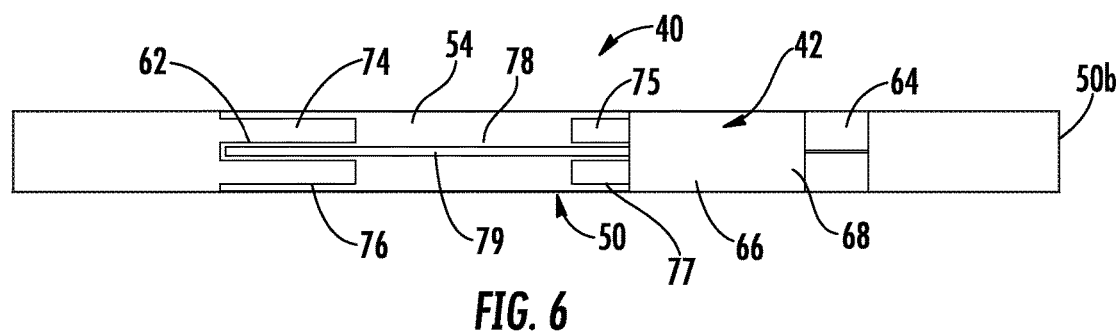
FIG. 6 is an enlarged bottom plan view of the second side of the dielectric strip in the antenna of FIG. 4.
Figure 7:
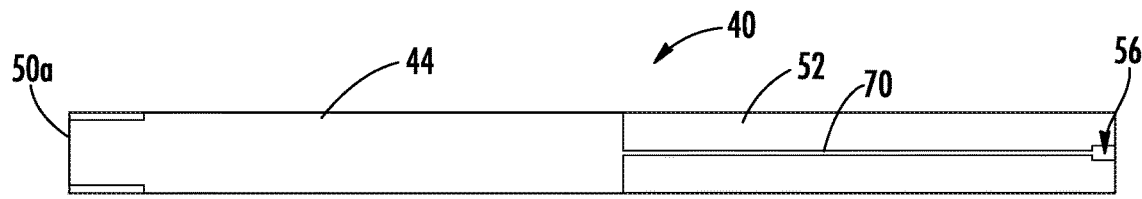
FIG. 7 is another enlarged top plan view of the first side of the dielectric strip in the antenna of FIG. 4.
Figure 8:
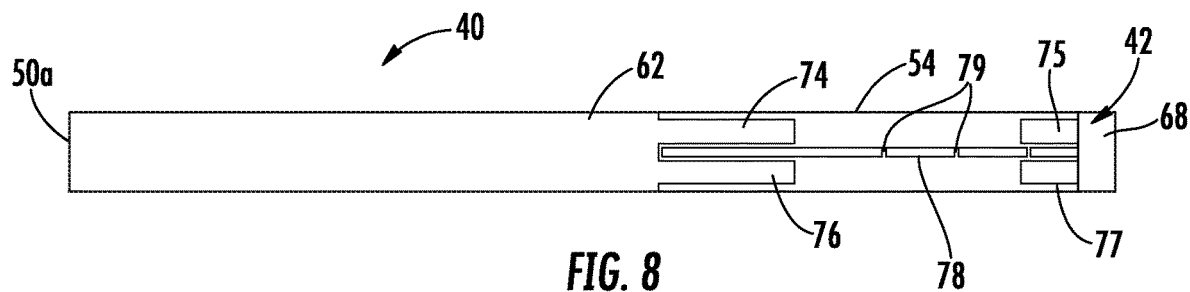
FIG. 8 is another enlarged bottom plan view of the second side of the dielectric strip in the antenna of FIG. 4.
Figure 9:
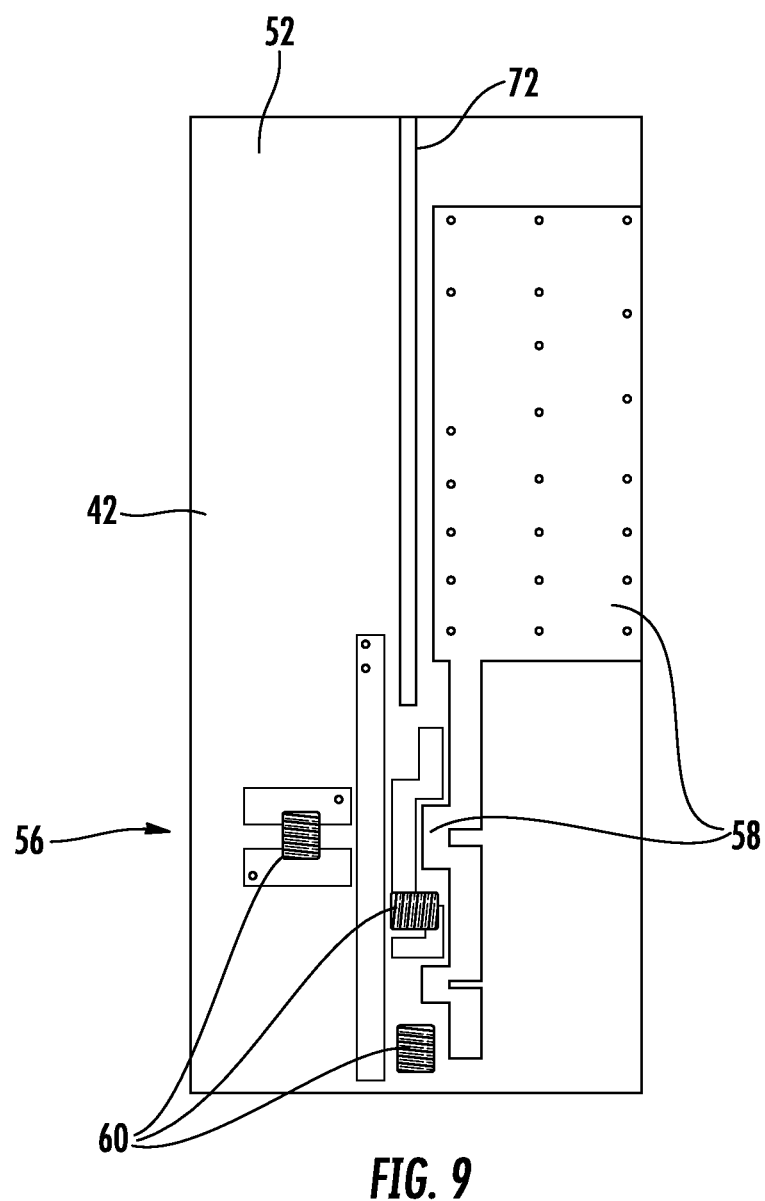
FIG. 9 is an enlarged top plan view of the diplexer circuit in the antenna of FIG. 4.

The antenna 40 includes an elongate dielectric strip 50 as best shown in FIG. 4, having opposing first and second sides 52, 54 with an enlarged portion of the first side shown in FIGS. 5 and 7, and an enlarged portion of the second side shown in FIGS. 6 and 8. A first conductive pattern defines the first radiating element 44 for a first frequency range on the first side 52 of the elongate dielectric strip 50 and a second conductive pattern defines the second radiating element 46 for a second frequency range on the first side 52 of the elongate dielectric strip. The first and second conductive patterns in an example can each be formed as a printed trace. The first radiating element 44 extends to a first end 50a of the elongate dielectric strip 50 and the second radiating element 46 extends to the second end 50b of the elongate dielectric strip 50. The second frequency range has a different frequency range than the first frequency range. Although different frequency ranges may be employed, in one example, the first frequency range is within the UHF band and is preferably between 225 to 450 MHz and the second frequency range is in the L-band and is preferably between 1300 to 2600 MHz. A diplexer circuit indicated generally at 56 is operative as a matching circuit and is on the first side 52 of the elongate dielectric strip 50 between the first and second radiating elements 44, 46 and coupled thereto as also shown in detail in FIG. 5. The diplexer circuit 56 includes a number of circuit traces 58 and circuit components 60 (FIG. 9) for antenna operation in the selected frequency bands. A third conductive pattern that can be formed as a printed trace defines the shared ground plane 42 for the first and second radiating elements 44, 46 on the second side 54 of the elongate dielectric strip 50 as best shown in the enlarged view of the second side in FIGS. 6 and 8.

The shared ground plane 42 includes longitudinally adjacent first and second ground plane portions 62, 64 (FIG. 6) and a filter 66 coupled between the first and second ground plane portions. The first and second ground plane portions 62, 64 function as a ground plane for the first radiating element 44 and the second ground plane portion 64 functions as a ground plane for the second radiating element 46 and the combined longitudinal length is shorter than the two individual lengths. In an example, the filter 66 may be formed as an isolating inductor that connects to the third conductive pattern defining the shared ground plane 42 on the second side 54 of the elongate dielectric strip 50 to create an electromagnetic boundary and permit those frequencies in the first frequency range, such as UHF frequencies, to view first and second ground plane portions 62, 64 as one electromagnetic structure, but block those frequencies in the second range of frequencies, such as the L-band frequency, from passing through the filter 66, therefore limiting the size of that second ground plane portion 64.

The filter 66 may be formed as an isolating inductor, and in one example, as a five (5) nanoHenry inductor, although the inductance value may vary depending on the operative frequencies for both the first and second frequency ranges, the size of the respective first and second radiating elements 44, 46, and the overall size of the elongate dielectric strip 50 in both width and length. The third conductive pattern defining the shared ground plane 42 of the first and second radiating elements 44, 46 may be patterned and operate using a selected induction value to form the filter 66, and the actual selected inductance is a function of the desired frequencies. In the illustrated embodiment shown in FIGS. 6 and 8, a rectangular section 68 of glass-reinforced epoxy laminate is placed over a section of the second side 54 near the shared ground plane 42 to add some rigidity to the area of the antenna 40 where the diplexer circuit 56 is located on the first side 52.

Figure 10:
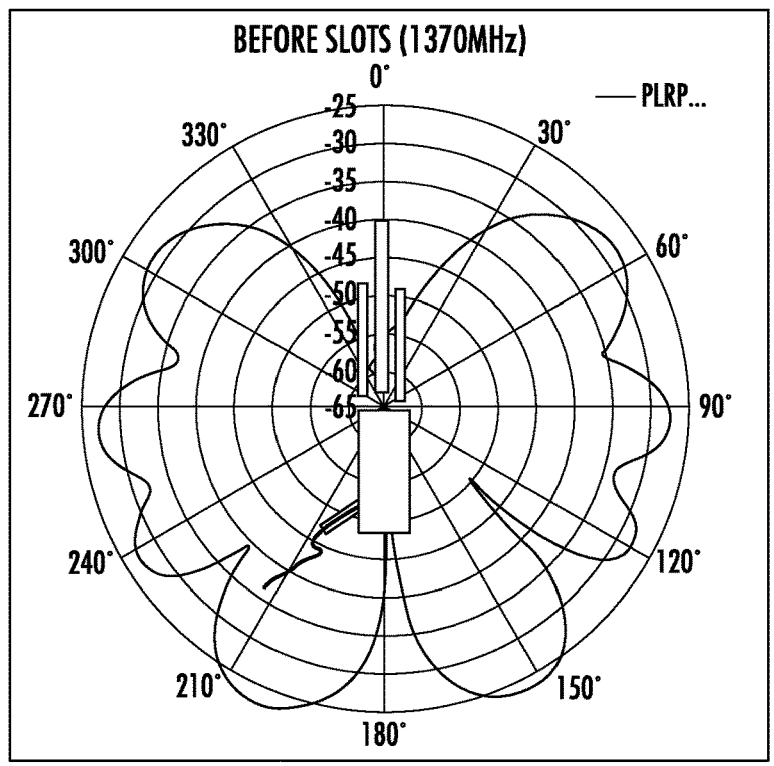
FIG. 10 is a graph showing an antenna pattern when no beam pattern shaping slots are incorporated in the antenna of FIG. 4.
Figure 11:
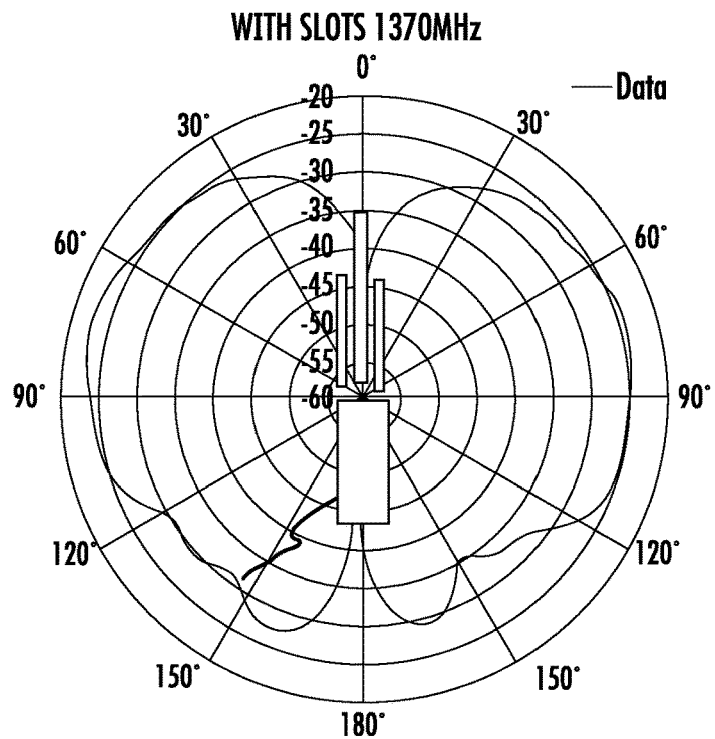
FIG. 11 is a graph showing an optimized antenna pattern when beam pattern shaping slots are incorporated into the antenna of FIG. 4.

A fourth conductive pattern such as formed as a printed trace is best shown in FIG. 4 and the enlarged plan views of FIGS. 5 and 7 and defines respective first and second transmission lines 70, 72 coupling the diplexer circuit 56 to the respective first and second radiating elements 44, 46 on the first side 52 of the elongate dielectric strip 50. The first ground plane portion 62 has at least one beam pattern shaping slot, and in the illustrated example, includes respective first and second beam pattern shaping slots 74, 75, 76, 77 aligned with the first and second transmission lines 70, 72, respectively (FIGS. 6 and 8). The first and second beam pattern shaping slots 74, 75, 76, 77 reduce the coupling of radiated fields that create a distorted antenna pattern shape as shown in the graph of FIG. 10, which is an example of an antenna beam pattern when no beam pattern shaping slot is formed in the first ground plane portion 62. The first and second beam pattern shaping slots 74, 75, 76, 77 reduce the coupling of the radiated fields from the first and second radiating element 46 and are positioned behind the first transmission line 70. An optimized L-band antenna pattern when the beam pattern shaping slots 74, 75, 76, 77 are used is shown in the antenna beam pattern graph of FIG. 11, which shows a better beam pattern in all elevation directions.

FIGS. 6 and 8 also show a characteristic impedance slot 78 extending in the center between the first and second beam pattern shaping slots 74, 75, 76, 77. As best shown in FIG. 8, this characteristic impedance slot 78 operates as a transmission line slot and includes shorting bars 79 formed transverse across a portion of the longitudinal length of the characteristic impedance slot. The shorting bars 79 operate with the characteristic impedance slot 78 so there will not be any potential difference that gives rise to other radiating modes.

Figure 12:
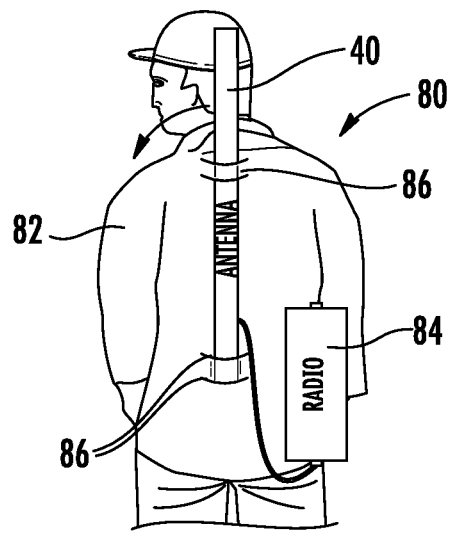
FIG. 12 is a fragmentary environmental view of a wearable radio system and the antenna of FIG. 4 in an extended position.
Figure 13:
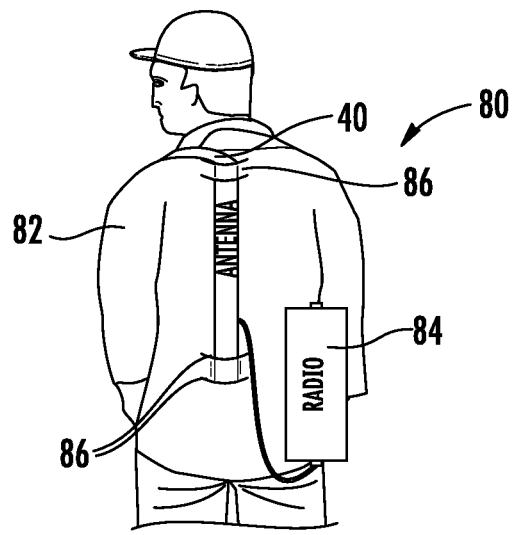
FIG. 13 is another fragmentary environmental view of the wearable radio system and the antenna of FIG. 4 in a retracted position.

Referring now to FIGS. 12 and 13, the antenna 40 is incorporated with a wearable radio system illustrated generally at 80 and includes a wearable vest 82 that is worn by the user, for example, associated with the military, a police search and rescue, an emergency unit, or a first responder. A radio transceiver 84 is carried by the wearable vest 82 and the antenna 40 is carried by the wearable vest and coupled to the radio transceiver. The elongate dielectric strip 50 is contained within a protective sheath, for example, a thick cloth housing to provide protection. The antenna 40 may be attached to coupling elements 86 of the vest or by other attachment mechanisms, for example, mobile straps.

As shown in FIG. 12, the antenna 40 is in an extended position with the second radiating element 46 corresponding to the L-band operating at the second frequency band extended upward. It does not extend beyond the head of the user. The antenna 40 is preferably formed with an elongate dielectric strip 50 that is bistable to allow the antenna to be pressed forward or "slapped" into a retracted position as shown in FIG. 13 where the top portion of the antenna conforms to the shoulder of the user. The antenna can be used in both positions. When it is extended as in FIG. 12, the second radiating element 46 operating in the second frequency band such as the L-band can still be as high as possible with minimal signal blockage. Part of the elongate dielectric strip 50 may include a bistable spring material that will coil around the shoulder when slapped against the shoulder as shown in FIG. 13.

Figure 14:
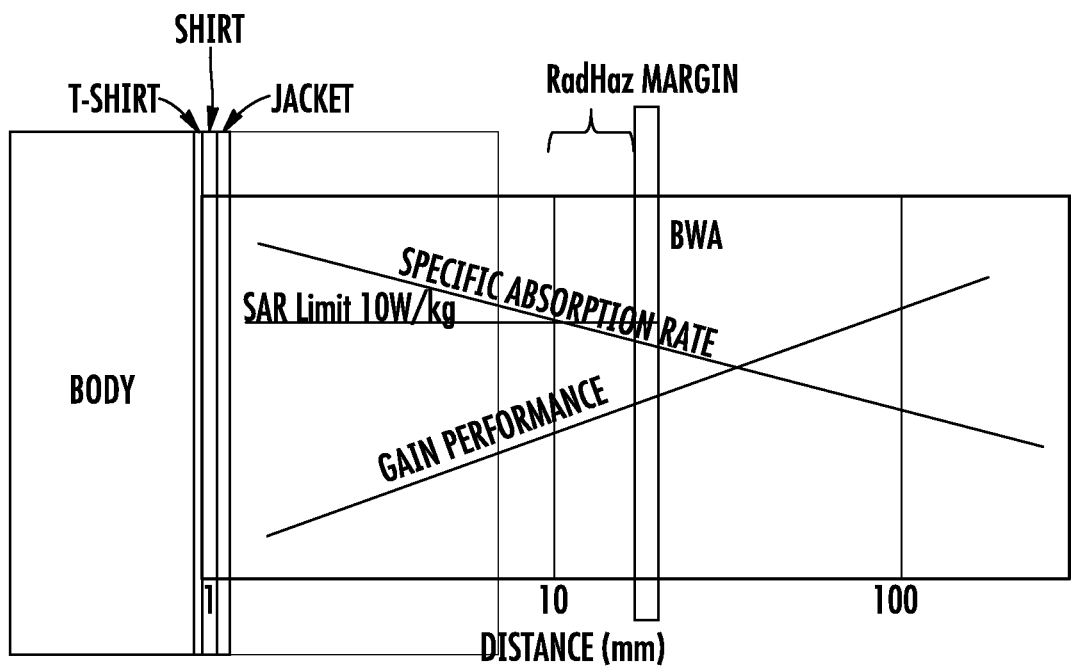
FIG. 14 is a graph showing an example of the radiation hazard of a body-worn antenna relative to distance from a body.
Figures 15, 16:
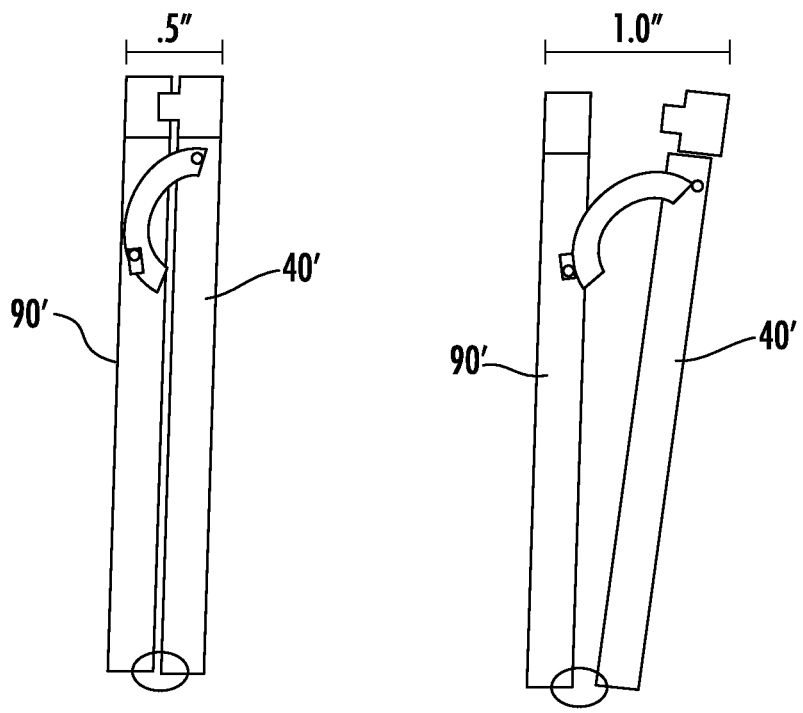
FIG. 15 is a fragmentary side elevation diagram of a hinge mount for the antenna in a retracted position of FIGS. 12 and 13.
FIG. 16 is another fragmentary side elevation diagram of the hinge mount for the antenna in an extended position of FIGS. 12 and 13.

Usually, the wearable vest 82 supporting the antenna 82 will provide the necessary distance between the user's body and antenna so that the specific absorption rate (SAR) in the body is reduced while antenna gain is increased as shown in the graph of FIG. 14, illustrating the SAR and antenna gain for a body-worn antenna. However, if a thin vest is used and the SAR is unsafe, it is possible to incorporate the antenna 40' with a hinge mount mechanism 90' as shown in FIGS. 15 and 16, which allows the antenna to be pivoted a distance sufficient to minimize SAR and maximize gain as shown in FIG. 16.

A method of making the antenna 40 includes forming a first conductive pattern defining a first radiating element 44 for a first frequency range on a first side 52 of the elongate dielectric strip 50 and forming a second conductive pattern defining a second radiating element 46 for a second frequency range on the first side of the elongate dielectric strip, the second frequency range being different than the first frequency range. The method includes forming a diplexer circuit 56 on the elongate dielectric strip 50 between the first and second radiating elements 44, 46 and coupled thereto and forming a third conductive pattern defining a shared ground plane 42 for the first and second radiating elements on a second side 54 of the elongate dielectric strip.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. An antenna comprising:
   an elongate dielectric strip having opposing first and second sides and comprising a bistable spring material moveable between an extended position and a retracted position and configured to coil around a shoulder of a wearer in the retracted position;
   a first conductive pattern defining a first radiating element for a first frequency range on the first side of said elongate dielectric strip;
   a second conductive pattern defining a second radiating element for a second frequency range on the first side of said elongate dielectric strip, the second frequency range being different than the first frequency range;

a diplexer circuit on said elongate dielectric strip between said first and second radiating elements and coupled thereto; and a third conductive pattern defining a shared ground plane for the first and second radiating elements on the second side of said elongate dielectric strip.

2. The antenna according to claim 1 wherein said shared ground plane comprises longitudinally adjacent first and second ground plane portions; and further comprising a filter coupled between the first and second ground plane portions so that the first and second ground plane portions function as a ground plane for the first radiating element and the second ground plane portion functions as a ground plane for the second radiating element.

3. The antenna according to claim 2 wherein said first ground plane portion has at least one beam pattern shaping slot therein.

4. The antenna according to claim 1 further comprising a fourth conductive pattern defining respective first and second transmission lines coupling the diplexer circuit to the respective first and second radiating elements on the first side of said elongate dielectric strip.

5. The antenna according to claim 4 wherein said shared ground plane comprises respective first and second slots therein aligned with said first and second transmission lines, respectively.

6. The antenna according to claim 1 wherein said first radiating element extends to a first end of said elongate dielectric strip; and wherein said second radiating element extends to a second end of said elongate dielectric strip.

7. The antenna according to claim 1 wherein said first frequency range is between 225 to 450 MHz; and the second frequency range is between 1300 to 2600 MHz.

8. A wearable radio system comprising:
a wearable vest;
a radio transceiver carried by said wearable vest; and
an antenna carried by said wearable vest and coupled to said radio transceiver;
said antenna comprising
an elongate dielectric strip having opposing first and second sides and comprising a bistable spring material moveable between an extended position and a retracted position and configured to coil around a shoulder of a wearer in the retracted position,
a first conductive pattern defining a first radiating element for a first frequency range on the first side of said elongate dielectric strip,
a second conductive pattern defining a second radiating element for a second frequency range on the first side of said elongate dielectric strip, the second frequency range being different than the first frequency range,
a diplexer circuit on said elongate dielectric strip between said first and second radiating elements and coupled thereto, and
a third conductive pattern defining a shared ground plane for the first and second radiating elements on the second side of said dielectric strip.

9. The wearable radio system according to claim 8 wherein said shared ground plane comprises longitudinally adjacent first and second ground plane portions; and further comprising a filter coupled between the first and second ground plane portions so that the first and second ground plane portions function as a ground plane for the first radiating element and the second ground plane portion functions as a ground plane for the second radiating element.

10. The wearable radio system according to claim 9 wherein said first ground plane portion has at least one beam pattern shaping slot therein.

11. The wearable radio system according to claim 8 further comprising a fourth conductive pattern defining respective first and second transmission lines coupling the diplexer circuit to the respective first and second radiating elements on the first side of said elongate dielectric strip.

12. The wearable radio system according to claim 11 wherein said shared ground plane comprises respective first and second slots therein aligned with said first and second transmission lines, respectively.

13. The wearable radio system according to claim 8 wherein said first radiating element extends to a first end of said elongate dielectric strip; and wherein said second radiating element extends to a second end of said elongate dielectric strip.

14. The wearable radio system according to claim 8 wherein the first frequency range is between 225 to 450 MHz; and the second frequency range is between 1300 to 2600 MHz.

15. A method of making an antenna comprising:
forming a first conductive pattern defining a first radiating element for a first frequency range on a first side of an elongate dielectric strip, the elongate dielectric strip comprising a bistable spring material moveable between an extended position and a retracted position and configured to coil around a shoulder of a wearer in the retracted position;
forming a second conductive pattern defining a second radiating element for a second frequency range on the first side of the elongate dielectric strip, the second frequency range being different than the first frequency range;
forming a diplexer circuit on the elongate dielectric strip between the first and second radiating elements and coupled thereto; and
forming a third conductive pattern defining a shared ground plane for the first and second radiating elements on a second side of the elongate dielectric strip.

16. The method according to claim 15 wherein the shared ground plane comprises longitudinally adjacent first and second ground plane portions; and further comprising coupling a filter between the first and second ground plane portions so that the first and second ground plane portions function as a ground plane for the first radiating element and the second ground plane portion functions as a ground plane for the second radiating element.

17. The method according to claim 16 comprising forming the first ground plane portion to have at least one beam pattern shaping slot therein.

18. The method according to claim 15 further comprising forming a fourth conductive pattern defining respective first and second transmission lines coupling the diplexer circuit to the respective first and second radiating elements on the first side of the elongate dielectric strip.

19. The method according to claim 18 comprising forming the shared ground plane with respective first and second slots therein aligned with the first and second transmission lines, respectively.

20. The method according to claim 15 wherein the first radiating element extends to a first end of the elongate dielectric strip; and wherein the second radiating element extends to a second end of said elongate dielectric strip.

21. The method according to claim 15 wherein the first frequency range is between 225 to 450 MHz; and the second frequency range is between 1300 to 2600 MHz.

* * * * *